US008491186B2

(12) United States Patent
Lawandy

(10) Patent No.: US 8,491,186 B2
(45) Date of Patent: Jul. 23, 2013

(54) CURRENCY FITNESS AND WEAR DETECTION USING TEMPERATURE MODULATED INFRARED DETECTION

(75) Inventor: Nabil M. Lawandy, Saunderstown, RI (US)

(73) Assignee: Spectra Systems Corporation, Providence, RI (US)

( * ) Notice: Subject to any disclaimer, the term of this patent is extended or adjusted under 35 U.S.C. 154(b) by 50 days.

(21) Appl. No.: 13/152,019

(22) Filed: Jun. 2, 2011

(65) Prior Publication Data

US 2012/0140791 A1 Jun. 7, 2012

Related U.S. Application Data

(60) Provisional application No. 61/351,113, filed on Jun. 3, 2010.

(51) Int. Cl.
*G01N 25/00* (2006.01)
*G06K 9/74* (2006.01)

(52) U.S. Cl.
USPC .............................................. 374/45; 356/71

(58) Field of Classification Search
USPC .............................................. 374/45; 356/71
See application file for complete search history.

(56) References Cited

U.S. PATENT DOCUMENTS 5,938,334 A * 8/1999 Kayani .......................... 374/44
2003/0234362 A1* 12/2003 Thierauf et al. ........... 250/341.6
2005/0241909 A1* 11/2005 Mazur et al. .................. 194/207
2007/0187579 A1* 8/2007 Wunderer et al. ............ 250/226
2008/0143328 A1* 6/2008 Thierauf et al. .............. 324/239
2008/0291465 A1* 11/2008 Lorraine et al. .............. 356/502
2009/0028415 A1* 1/2009 Giering et al. ................ 382/137
2009/0051158 A1* 2/2009 Scholz et al. .................. 283/92
2009/0225303 A1* 9/2009 Giering et al. .................. 356/71
2009/0312957 A1* 12/2009 Domke et al. .................. 702/39

FOREIGN PATENT DOCUMENTS

WO WO 96/18978 6/1996

OTHER PUBLICATIONS

PCT International Search Report for International Patent Application No. PCT/US2011/038920, mailed Sep. 23, 2011, 3 pgs.
PCT Written Opinion of the International Searching Authority for International Patent Application No. PCT/US2011/038920, mailed Sep. 23, 2011, 5 pgs.

* cited by examiner

*Primary Examiner* — Lisa Caputo
*Assistant Examiner* — Jamel Williams
(74) *Attorney, Agent, or Firm* — Barlow, Josephs & Holmes, Ltd.

(57) ABSTRACT

In part, the invention relates to methods, systems, and devices that use thermal transients to diagnose wear or other damage in a document such as a banknote. In one embodiment, the invention performs various steps including applying a transient heating or cooling stimulus to the document, wherein the document includes a substrate and a plurality of elements thermally dissimilar to the substrate; detecting a differential thermal emission signature for the substrate and each thermally dissimilar element using a sensor; and determining a wear status of the document based on the detected differential thermal emission signatures.

19 Claims, 5 Drawing Sheets

CURRENCY FITNESS AND WEAR DETECTION USING TEMPERATURE MODULATED INFRARED DETECTION

CROSS-REFERENCE TO RELATED APPLICATIONS

This application claims the benefit of U.S. Provisional Patent Application No. 61/351,113 filed Jun. 3, 2010, the entire disclosure of which is incorporated herein by reference.

FIELD OF INVENTION

In part, the present invention relates to detecting fitness and wear of currency and other processed documents such as banknotes.

BACKGROUND

Banknotes in circulation must meet certain criteria for use by the public and processing by commercial banks. These criteria relate to the degrees of soiling, wear, rips, holes, and tears, among other things which determine the fitness of banknotes to remain in circulation. Central banks utilize detection systems on banknote sorting machines to measure and quantify the condition of banknotes as they are processed and tested for authenticity.

The primary methods for evaluation of the fitness of banknotes rely on optical imaging and in some cases on the transmission of electromagnetic waves of various wavelengths to determine soiling from ink patterns. High speed linear and two-dimensional camera systems exploit the passage of the banknotes to produce images and examine them with various filters, matching them to standard reference images to determine if they are in sufficiently good condition to return to the public domain. These optical techniques are often incapable of detecting severe creasing, pinholes, and transparent tape used for repairing torn notes.

Accordingly, what is needed are methods and systems for detecting fitness and wear characteristics in currency such as banknotes or in other valuable documents that address the deficiency identified above.

SUMMARY

In part, the invention relates to various heat and electromagnetic wave-based systems and methods for detecting fitness and wear characteristics in currency such as banknotes or in other valuable documents. Some embodiments of the invention use deep infrared thermal transient imaging ("DIRTTI") techniques and related devices. In one embodiment, temperature modulated infrared detection and/or thermal transient imaging are used to determine if a given piece of currency should be taken out of or remain in circulation. A subsystem or device for using these and other methodologies can be incorporated in a counting device for banknotes or other items of currency such that the task of counting and rejecting such items can be performed simultaneously.

In one embodiment, the invention relates to a method of imaging thermal transients for diagnosing wear in a document. The method includes the steps of applying a transient heating or cooling stimulus to the document, wherein the document comprises a substrate and a plurality of elements thermally dissimilar to the substrate; detecting a differential thermal emission signature for the substrate and each thermally dissimilar element using a sensor; and determining a wear status of the document based on the detected differential thermal emission signatures. In one embodiment, the transient heating or cooling stimulus comprises a transient heat pulse. In one embodiment, the method further includes the step of imaging the document by temperature modulated infrared detection. In one embodiment, the method further includes the step of imaging the document by deep infrared thermal transient imaging.

In one embodiment, the differential thermal emission signature is based on a property of either the substrate or the plurality of elements selected from group consisting of heat capacity, thermal mass, thermal conductivity, thermal diffusivity, and thermal emissivity. In one embodiment, the differential thermal emission signature is in the infrared region of the electromagnetic spectrum and wherein the step of determining the wear status includes comparing data collected from the banknote with a substantially uncirculated version of such a document to determine the wear status. In one embodiment, the differential thermal emission signature is an emission from an optically variable ink disposed on or in the substrate. In one embodiment, the plurality of elements thermally dissimilar to the substrate is selected from the group consisting of an optically variable ink, a heat active ink, an embedded tactile feature, Braille indicia, a watermark, tape, glue, and adhesive. In one embodiment, the document is a banknote.

In one embodiment, the invention relates to a system for imaging thermal transients for determining an amount of wear in a document. The system can include a transport machine capable of processing a document, wherein the document comprises a substrate and a plurality of elements thermally dissimilar to the substrate, the transport machine comprising: a temperature changing device configured to cause a transient temperature change in the document such that the temperature change causes a differential thermal emission from the substrate and each thermally dissimilar element; a sensor positioned to record each differential thermal emission; and a processor in electrical communication with the sensor and programmed to determine the amount of wear. In one embodiment, the transport machine performs a function selected from the group consisting of sensing, sorting, counting, coding, and authenticating. In one embodiment, the temperature changing device is driven by or receives room temperature compressed air. In one embodiment, the temperature changing device separates pressurized gas into hot and cold fractions.

In one embodiment, the temperature changing device is a Ranque-Hilsch tube. In one embodiment, the sensor is selected from the group consisting of an electrical sensor, an optical sensor, an infrared sensor, and a fluid sensor. In one embodiment, the processor is programmed to cause the transport machine to separate a first document exhibiting a first amount of wear from a second document that exhibits a second amount of wear that is less than the first amount of wear. In one embodiment, the sensor operates in the range of about 7 microns to about 15 microns.

In one embodiment, the invention relates to a system for determining whether a banknote should be taken out of or remain in circulation. The system can include a temperature changing device configured to cause a transient temperature change in the banknote, wherein the banknote comprises a substrate and a plurality of elements thermally dissimilar to the substrate, such that the temperature change causes a differential thermal emission from the substrate and each thermally dissimilar element; and a sensor positioned to record each differential thermal emission; and a processor in electrical connection with the sensor and programmed to determine whether the banknote should be taken out of circulation in response to an amount of wear of the banknote as determined from at least one of the differential thermal emissions. In one embodiment, the temperature changing-device includes a Ranque-Hilsch tube. In one embodiment, the invention further includes a source of electromagnetic radiation for illuminating the substrate and each thermally dissimilar element.

BRIEF DESCRIPTION OF THE DRAWINGS

The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Figure 1:
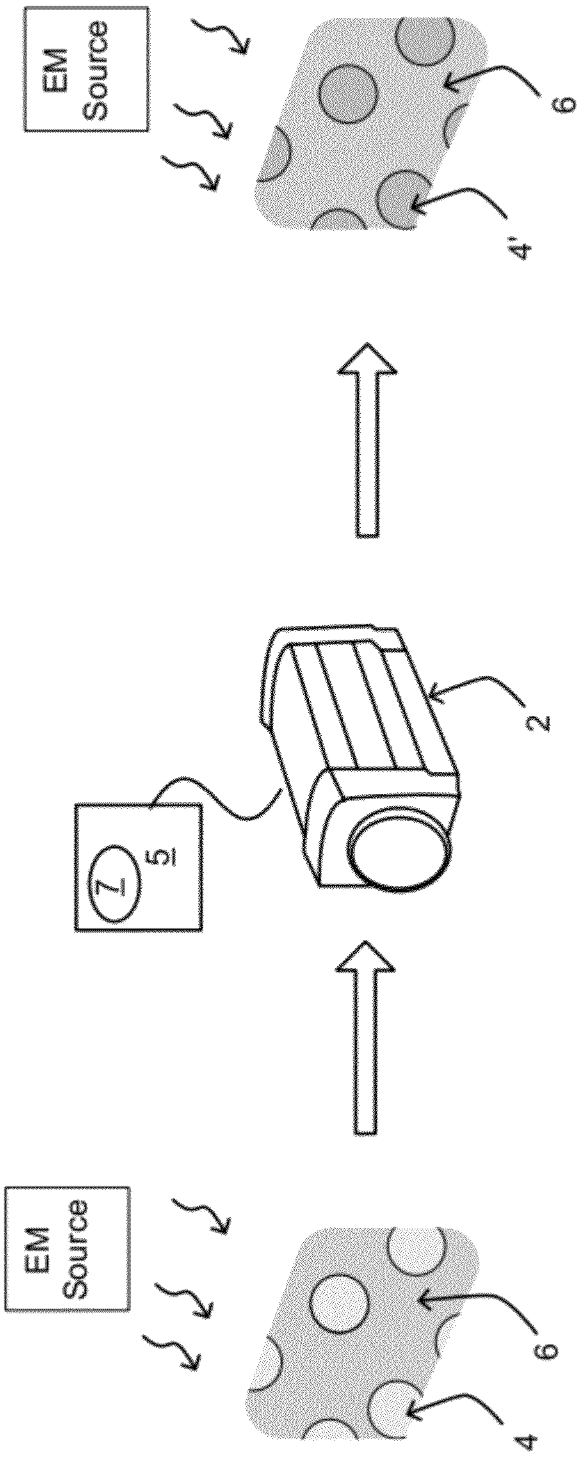
FIG. 1 is a schematic diagram showing a substrate that is imaged for thermal transients according to an illustrative embodiment of the invention.

The invention will be more completely understood through the following detailed description, which should be read in conjunction with the attached drawings. Detailed embodiments of the invention are disclosed herein; however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

In part, embodiments of the invention relate to systems and methods for diagnosing a wear status in a document such as a banknote or other paper currency. A document's wear status or how worn the document is from being handled or processed can also include determining whether the document should be removed from circulation.

Embodiments of the invention relate to systems, methods and devices that use transient heating and cooling to produce differential emission in the infrared region of the electromagnetic spectrum from various parts of a banknote. Specifically, these different parts or regions of given banknote absorb heat and cool differently due to differing material properties. In one embodiment, the relevant wavelength range of the electromagnetic spectrum range from about 1 micron to about 500 microns. However, other wavelengths of light can be used in various embodiments.

According to one embodiment, a region of a banknote is accessible and machine readable by commercially available infrared cameras operating in the range of about 7 microns to about 15 microns. Heating or cooling of the banknote occurs on time scales determined by the thickness of the banknote substrate, inks, and foils as well as their material properties and any dirt or graffiti or other coatings. Depending on the substrates (polymer, paper or combinations, and other added materials), these time scales rage from microseconds to milliseconds.

The differences in emissions of the various parts of the note further amplify the infrared emission given off and registered by the cameras. Variations in emission from regions of a note during transport at 10 m/second occur on time scales determined by the thickness and material properties. In turn, while the emissivity differences of the various parts further amplify the infrared emission variations given off by regions of the note, a camera or sensor such as an ultra-fast bolometer-array based camera can be placed near the note to capture and/or register such emissions. The width and thickness of a given note being evaluated or simultaneously counted can also be used to calibrate the sensor or a processor or computer in communication with the sensor. Thus, when emissions are captured, the emissions are matched to a given note which can then be evaluated as acceptable or unacceptable for circulation.

According to one illustrative embodiment, a piece of transparent tape affixed to a banknote will exhibit a different emissivity characteristic of its polymers while also increasing the physical thickness of the banknote locally. Thus, a piece of tape, which is correlated with the note having been damaged and repaired, changes the rate of heat diffusion into the note. Such a heat diffusion rate change can then be correlated with or used as a signature or indicia of damage to the bank note.

In addition, optically variable ink ("OVI") materials, used in banknotes and currency, have different thermal diffusivities and heat capacities, which result in measurable temperature differences. Heat active inks and embedded tactile features will also exhibit such local thermal emission signatures. Thus, by applying light of a suitable wavelength, heating or otherwise causing or capturing temperature differences and/or emissions from a banknote or other currency allows for such papers to be evaluated for damage. In one embodiment, the heat and light sensitive properties of a given banknote can be captured and compared relative to a pristine or substantially undamaged banknote to determine a level of damage to the previously circulated note.

Embodiments of the invention also detect raised features and features resulting from reduced or compressed banknote thickness, such as Braille indices and watermarks, since the local surface features as well as the reduced thickness result in transient local blackbody thermal emission variations.

FIG. 1 demonstrates how a high speed thermal camera array (2) images warm water droplets (4 and 4') (clear to the visible) due to their differential infrared emission relative to the substrate (6). For example, applying a wavelength of about 7.5 to about 13 microns from an electromagnetic radiation (EM) source to a substrate having thermal sensitivity between about 30 C to about 50 mK produces an accurate thermal map of the object once a heat or cooling stimulus is applied. This provides visualization of thermal properties under non-equilibrium conditions, such as heat capacity, thermal conductivity, and emissivity. Thus, in one embodiment a sensor such as a camera (2) is used that is sensitive to material composition and thermal contact. The sensor or camera (2) can be in electrical communication with a computer or processor (5) running suitable software (7). In one embodiment, the software can include suitable data analysis software, image processing software and/or a database.

Thus, the responsiveness of a droplet at a first point in time (4) to heat or EM can be tracked as it changes or receives energy as a droplet at a second point in time (4'). The same approach applies to different regions of a banknote which can exhibit different responsiveness akin to that of the water droplet before stimulation (4) and after stimulation (4').

Heating and cooling by fractions of a degree can be implemented using simple heating elements while the banknote is traversing the sensing regions using methods suitable for use on currency or banknote transports. Examples of suitable transports include, without limitation, the BPS 3000, a multifunction payment kiosk from Rototype® International, and similar transports from De La Rue®, a provider of cash sorting equipment and software solutions, and others.

Figure 2B:
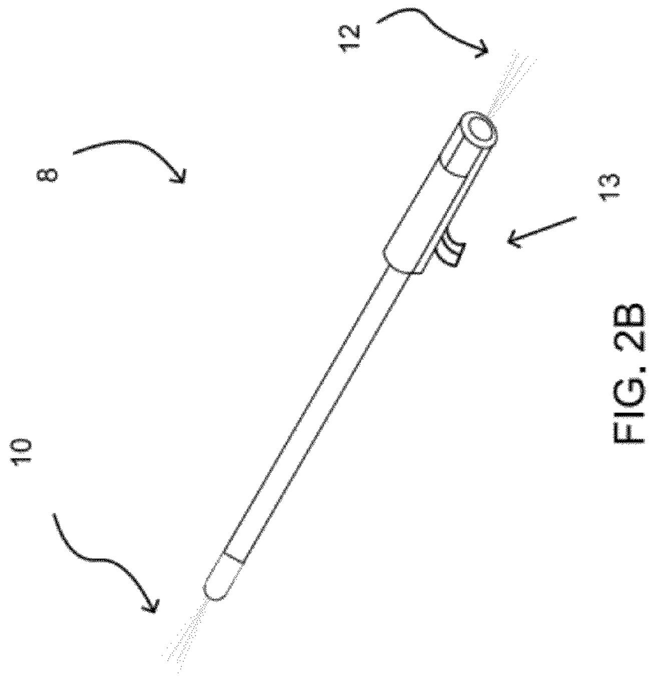
FIGS. 2A and 2B are schematic diagrams showing a transient heating and cooling apparatus that may be used in connection with an illustrative embodiment of the invention.
Figure 2C:
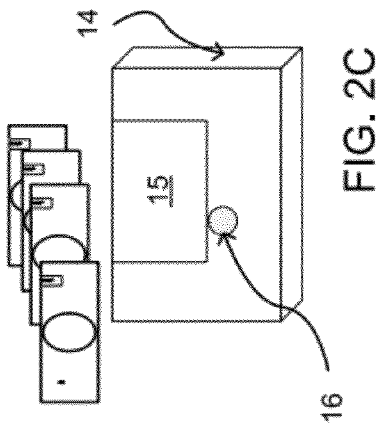
FIG. 2C is a schematic diagram showing a counting machine including a device or subsystem for determining if banknotes or other currency should remain in circulation in accordance with an illustrative embodiment of the invention.
Figure 2A:
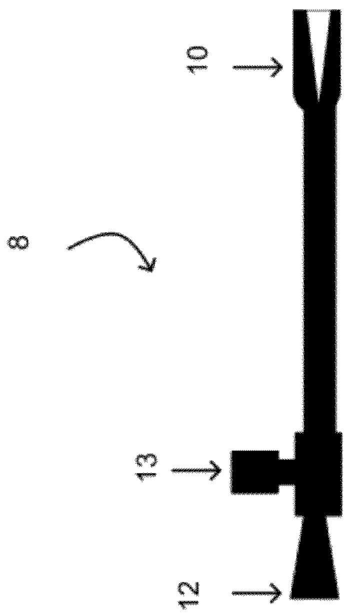

According to one embodiment, the heating and cooling processes, as shown in FIGS. 2A, 2B and 2C, can be implemented while the banknote is traversing the sensor regions of a sorting machine using electrical, optical, infrared or fluidics-based methods.

Transient heating and cooling may take place at the palette with nominal infrastructure and equipment requiring no toxic materials and no complicated refrigeration or heating. As shown in FIGS. 2A and 2B, one such embodiment includes a system for implementing a currency evaluation method that uses a Ranque-Hilsch tube (8). The tube (8), which separates hot air (10) and cold air (12), may be driven by room temperature compressed air (13).

FIG. 2A shows a cross-sectional view of the tube (8) while FIG. 2B shows a perspective view of the tube (8). In one embodiment, the tube (8) separates pressurized gas into cold and hot fractions, has no moving parts, equally adjustable for temperature flow at temperatures from −40 C to 120 C, and is capable of refrigeration up to 10,000 Btu/hr. The tube (8) is capable of heating or cooling off the banknote during processing at standard throughput rates (10-40 notes/sec) of a sorting machine.

Alternatively, in one embodiment, a sorting or counting machine (14) such as shown in FIG. 2C having an input (15) for banknotes or other currency also includes a currency evaluation system (16) that can include a sensor and a Ranque-Hilsch tube (8) configured to detect currency that should be taken out of circulation. In one embodiment, currency is flagged as warranting removal from circulation based on a threshold specified with respect to acceptable level of transient changes being met or exceeded.

In another embodiment of the invention, banknote fitness characteristics can be diagnosed using thermal transient imaging which would not otherwise be detected by optical imaging or transmission signature methods. The system also detects features which can be detected by optical methods using a basic optical currency inspection sensor provided by Giesecke & Devrient GmbH (Prinzregentenstrasse 159, D-81677 Munich, Germany). In one embodiment, the invention provides significantly expanded data for decision making algorithms, to provide a more comprehensive multi-sensor system for either returning banknotes back into circulation or removing them from circulation based on a determination of the fitness of such banknotes.

Figure 3:
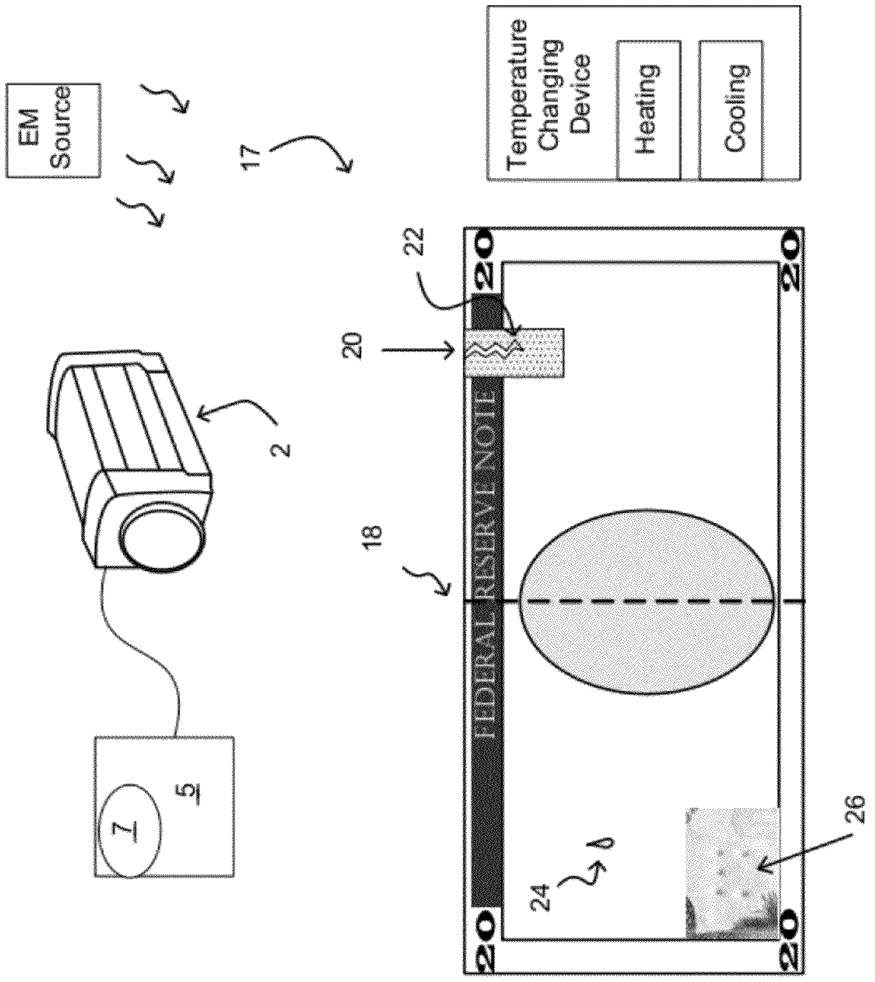
FIG. 3 is a schematic diagram showing a banknote being imaged for thermal transients and evaluated for continued circulation or removal from circulation according to an illustrative embodiment of the invention.

FIG. 3 shows a system for evaluating a banknote using an electromagnetic energy based data collection system. As used herein, the term banknote also includes any other type of paper currency. FIG. 3 shows a sensor such as a camera (2) in communication with a computer (5) having a processor (7). The sensor (2) captures, detects or records emissions from the banknote which correspond to damaged and undamaged or worn and unworn regions of the substrate and elements where specific wear or damage has occurred. Emissions can be caused by the application of EM from an EM source in one embodiment. A temperature changing device having a heating element and a cooling element or only one of either such element can be used to cause transient emissions from the substrate and regions or elements in or on the substrate.

In one embodiment, the emissions occur in the infrared spectrum and are stored as images in the computer or another data store. The infrared images recorded using the sensor or camera are then analyzed using various algorithms executing on the processor (7) to determine if the images indicate a defect or other problem with the banknote (17), such as problems resulting from creases (18), tears (20), tape (22), closed tears or pinholes (24), and Braille (26) as shown in FIG. 3. Defects or other structures in FIG. 3 are visible as fractions of a degree, to several degrees on a scale of 90-104 degrees F. Thus, each defect, tear or other structure can have its own temperature specific signature that ranges from fractions of a degree, between greater than 0 degrees to less than or equal to about 1 degrees or over several degrees such as from about 1 to about 20 degrees. The difference in emissions from worn and unworn regions or elements can be evaluated using the processor and provide the basis for taking the banknote out of circulation. One or more of the elements shown in FIG. 3 can be included in a banknote or other substrate sorting or transport machine.

Figures 3A, 3B, 3C:
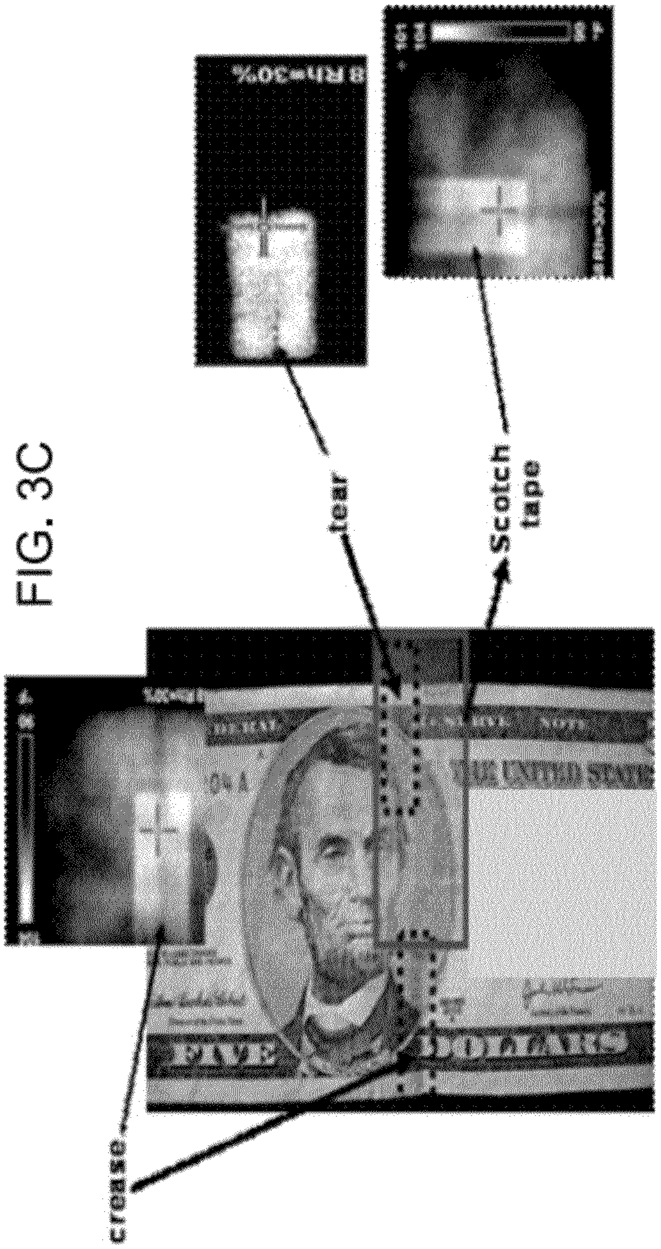
FIG. 3A is an infrared image of a tear on a banknote detected using a sensor according to an illustrative embodiment of the invention.
FIG. 3B is an infrared image of a piece of tape on a banknote detected using a sensor according to an illustrative embodiment of the invention.
FIG. 3C is an infrared image of a crease on a banknote detected using a sensor according to an illustrative embodiment of the invention.

FIGS. 3A-3G show various images generated from portions of a substrate corresponding to a banknote in response to emissions from elements in or on the substrate corresponding to damaged or worn regions relative to other less damaged, less worn, or undamaged regions of the substrate or another substrate such as master uncirculated substrate. Specifically, FIGS. 3A-3C are infrared images of a tear, piece of tape, and crease, respectively, on a banknote recorded or otherwise detected using a sensor such as a camera according to an illustrative embodiment of the invention. These elements can be used to determine a level of wear and ultimately whether a given banknote should come out of circulation.

Figure 3D:
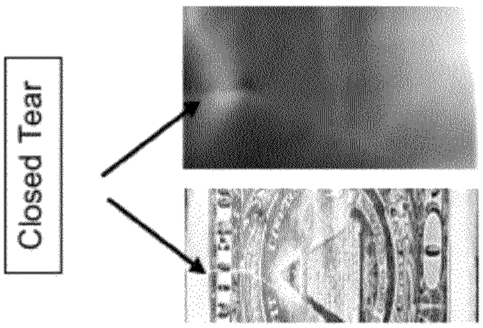
FIG. 3D is an infrared image of a closed tear on a banknote detected using a sensor according to an illustrative embodiment of the invention.

According to one embodiment of the invention, closed tears on the edges of a note or document, nearly invisible to the naked eye, may be detected. Closed tears with crack openings from about 0.0 to about 0.5 mm are extremely difficult to detect, particularly in the presence of graffiti and other optical noise in the image. The systems and methods described here are suitable for detecting such features due to the slight thermal differences that arise when the paper matrix is torn, creating a different composite thermal diffusivity in the tear region. FIG. 3D is an infrared image of a closed tear on a banknote according to an illustrative embodiment of the invention.

Figure 3E:
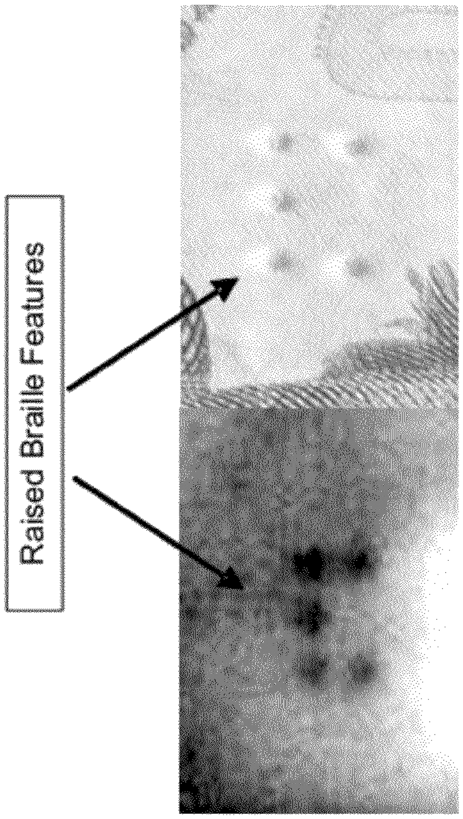
FIG. 3E is an infrared image of raised Braille features on a banknote according to an illustrative embodiment of the invention.

Another embodiment of the invention involves enhanced detection of features for the visually impaired. Features such as Braille, created through raised features on a banknote, have been used successfully in Chinese currency and could potentially be an easy solution to implement for use by visually impaired Americans. Since U.S. currency bills are all the same size and shape, such a feature would be the only way that a visually impaired individual can denominate U.S. currency. It would be of paramount importance that the consistent presence of this feature remains at a certain tactile level in notes that have been in circulation to ensure the proper identification and denomination of the currency. According to one embodiment of the invention, a transient infrared sensor has a potential to detect such tactile features as well as other features which rely on similar compression and or thinning of the banknote. FIG. 3E is an infrared image of raised Braille features on a banknote according to an illustrative embodiment of the invention.

A similar effect occurs in a watermark as a consequence of the compression or thinning of the substrate material, such as paper. For example, a thermal transient heat pulse was applied to an entire banknote and an image was taken using a sensor in emission of a watermark in a sample of U.S. currency, which image revealed that the watermark had been compromised by compression or thinning of the banknote paper.

Another embodiment of the invention includes secondary OVI detection and verification. The detection of OVI signatures may be performed through optical methods that exploit high angle imaging to resolve the diffractive effect of the feature. Counterfeiters, however, have successfully used materials with similar diffractive signatures made of polymeric materials and polymer liquid crystals. Several suppliers today make such coatings for car bodies and high end packaging applications.

Figure 3F:
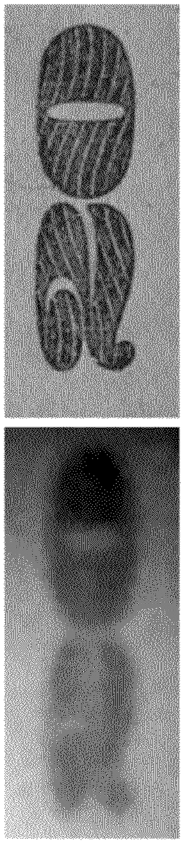
FIG. 3F is an infrared image of a denomination on a banknote detected using a sensor according to an illustrative embodiment of the invention.

OVI features on U.S. currency are produced from chemical vapor deposition ("CVD") methods using materials with significantly different thermal properties characteristic of inorganic materials. According to one embodiment of the invention, the unique difference in thermal mass results in thermal transient IR imaging signatures that are used with other sensors to verify an OVI security feature and to determine if the feature is still robust enough for the banknote to return to circulation. FIG. 3F is an infrared image of a denomination on a banknote according to an illustrative embodiment of the invention.

Figure 3G:
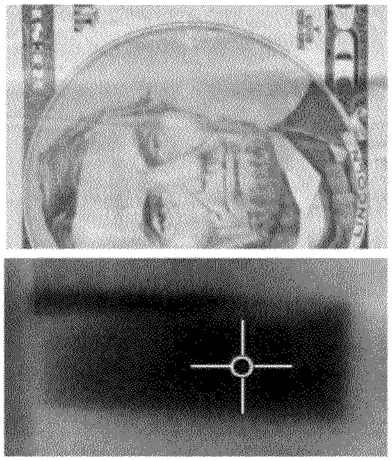
FIG. 3G is an infrared image of a piece of tape on a banknote detected using a sensor according to an illustrative embodiment of the invention.

Another embodiment of the invention includes the detection of transparent tapes on notes, currency or other documents. Many banknotes in circulation are ripped or have closed tears which have been reinforced with transparent tapes or other adhesives. These tapes often have a matte finish which makes them difficult to detect. These tapes, however, are polymeric materials with significantly different thermal mass, thermal diffusivity, and infrared emissivity than the paper banknotes. These significantly different properties in the additional sensing dimension of transient infrared emission result in high resolution detection of tapes and other polymeric materials such as glues and adhesives of various types. A thermal transient IR imaging sensor in combination with a suitable visible light imaging sensors can be used for the detection of such materials that drastically affect note fitness. FIG. 3G is an infrared image of a piece of tape on a banknote according to an illustrative embodiment of the invention.

While embodiments of the invention described herein disclose the detection of characteristics of banknotes, one skilled in the art should recognize that the scope and spirit of the invention should not be limited to banknotes alone. Other machine readable or valuable documents may be utilized without deviating from the scope of the invention.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

The invention claimed is:

1. A method of imaging thermal transients for diagnosing relative wear in a document comprising the steps of:

applying a transient heating or cooling stimulus to the document, wherein the document comprises a substrate and a plurality of elements thermally dissimilar to the substrate;

detecting a differential thermal emission signature for the substrate and each thermally dissimilar element using a sensor;

comparing said thermal emission signature to a thermal emission signature collected from a substantially uncirculated version of said document; and determining a wear status of the document based on the detected differential as between said two thermal emission signatures.

2. The method of claim 1 wherein the transient heating or cooling stimulus comprises a transient heat pulse.

3. The method of claim 1 further comprising the step of imaging the document by temperature modulated infrared detection.

4. The method of claim 1 further comprising the step of imaging the document by deep infrared thermal transient imaging.

5. The method of claim 1 wherein the differential thermal emission signature is based on a property of either the substrate or the plurality of elements selected from group consisting of heat capacity, thermal mass, thermal conductivity, thermal diffusivity, and thermal emissivity.

6. The method of claim 1 wherein the differential thermal emission signature is an emission from an optically variable ink disposed on or in the substrate.

7. The method of claim 1 wherein the plurality of elements thermally dissimilar to the substrate is selected from the group consisting of an optically variable ink, a heat active ink, an embedded tactile feature, Braille indicia, a watermark, tape, glue, and adhesive.

8. The method of claim 1 wherein the document is a banknote.

9. A system for imaging thermal transients for determining a relative amount of wear in a document comprising:

a transport machine capable of processing a document, wherein the document comprises a substrate and a plurality of elements thermally dissimilar to the substrate, the transport machine comprising: a temperature changing device configured to cause a transient temperature change in the document such that the temperature change causes a differential thermal emission from the substrate and each thermally dissimilar element;

a sensor positioned to record each differential thermal emission; and a processor in electrical communication with the sensor and programmed to compare said thermal emission to a thermal emission collected from a substantially uncirculated version of said document to determine the amount of wear.

10. The system of claim 9 wherein the transport machine performs a function selected from the group consisting of sensing, sorting, counting, coding, and authenticating.

11. The system of claim 9 wherein the temperature changing device is driven by room temperature compressed air.

12. The system of claim 9 wherein the temperature changing device separates pressurized gas into hot and cold fractions.

13. The system of claim 9 wherein the temperature changing device is a Ranque-Hilsch tube.

14. The system of claim 9 wherein the sensor is selected from the group consisting of an electrical sensor, an optical sensor, an infrared sensor, and a fluid sensor.

15. The system of claim 9 wherein the processor is programmed to cause the transport machine to separate a first document exhibiting a first amount of wear from a second document exhibiting a second amount of wear that is less than the first amount of wear.

16. The system of claim 9 wherein the sensor operates in the range of about 7 microns to about 15 microns.

17. A system for determining whether a banknote should be taken out of or remain in circulation comprising:

a temperature changing device configured to cause a transient temperature change in the banknote, wherein the banknote comprises a substrate and a plurality of elements thermally dissimilar to the substrate, such that the temperature change causes a differential thermal emission from the substrate and each thermally dissimilar element; and a sensor positioned to record each differential thermal emission; and a processor in electrical connection with the sensor and programmed to determine whether the banknote should be taken out of circulation in response to an amount of wear of the banknote as determined by comparing said thermal emission to a thermal emission collected from a substantially uncirculated version of said bank note.

18. The system of claim 17 wherein the temperature changing-device comprises a Ranque-Hilsch tube.

19. The system of claim 17 further comprising a source of electromagnetic radiation for illuminating the substrate and each thermally dissimilar element.

* * * * *